(12) United States Patent
Huh et al.

(10) Patent No.: US 7,059,592 B2
(45) Date of Patent: Jun. 13, 2006

(54) GAS CYLINDER

(75) Inventors: Song Huh, Gyeonggi-do (KR); Gi Jong Kim, Seoul (KR)

(73) Assignee: Sam Hong SA Co., Ltd., Seoul (KR)

( * ) Notice: Subject to any disclaimer, the term of this patent is extended or adjusted under 35 U.S.C. 154(b) by 380 days.

(21) Appl. No.: 10/454,637

(22) Filed: Jun. 5, 2003

(65) Prior Publication Data

US 2004/0124570 A1 Jul. 1, 2004

(30) Foreign Application Priority Data

Dec. 31, 2002 (KR) ...................... 20-2002-0039121
Apr. 25, 2003 (KR) ...................... 10-2003-0026267

(51) Int. Cl.
*A47C 3/20* (2006.01)

(52) U.S. Cl. ............................. 267/64.12; 297/344.19; 248/161; 188/300

(58) Field of Classification Search ............. 267/64.12, 267/120; 188/300; 248/161; 297/344.19
See application file for complete search history.

(56) References Cited

U.S. PATENT DOCUMENTS

| 5,131,615 | A | 7/1992 | Hosan et al. ................ 248/161 |
| 5,161,786 | A | 11/1992 | Cohen ...................... 267/64.12 |
| 5,443,573 | A | 8/1995 | Thiele et al. ............. 267/64.12 |
| 5,992,940 | A | 11/1999 | Chen ........................ 297/463.1 |
| 6,276,756 | B1 | 8/2001 | Cho et al. .............. 297/344.19 |
| 6,371,421 | B1 | 4/2002 | Ma et al. ..................... 248/161 |
| 6,474,619 | B1 | 11/2002 | Ma ............................ 248/631 |

*Primary Examiner*—Christopher P. Schwartz
(74) *Attorney, Agent, or Firm*—Richard C. Litman

(57) ABSTRACT

Disclosed is a gas cylinder capable of operating in a stable manner, including: a release arm connected to one end of a predetermined cable, for being rotated by pulling operation of the cable; a taper holder for receiving the release arm in its inside, and for supporting the position of the release arm upon movement of the release arm; and a busing inserted into the contact surface between the spindle and the base tube of the gas cylinder, for reducing frictional force upon up and down movement of the spindle.

19 Claims, 6 Drawing Sheets

GAS CYLINDER

BACKGROUND OF THE INVENTION

1. Field of the Invention

The present invention relates to a gas cylinder and more particularly to a gas cylinder operable in a more convenient and stable manner by operating a gas opening/closing pin using a predetermined button formed in a convenient position for a user to easily operate and a cable cooperating with the button, and capable of maintaining its up and down movement in a stable manner.

2. Background of the Related Art

The gas cylinder is an apparatus formed between a seat of a chair and a chair base, for being used in adjusting height of the seat. Also, the gas cylinder may be applied to a variety of apparatus such as an impulse buffering apparatus for a vehicle as well as an apparatus for adjusting height of a seat of a chair.

But, in the gas cylinder of the related art, a gas opening/closing pin should operate up and down directions with use of a separate knob formed on the lower side of a seat of a chair. Therefore, there exists a problem that a user should bend the body in order to operate the knob.

Also, deviation from coaxiality between a spindle, a base tube for guiding up and down movement of the spindle and part coaxially formed together with the base tube, is distorted, so that disorder against normal operation of the gas cylinder is frequently generated.

In order to resolve such inconvenience, U.S. Pat. No. 6,276,756 B1 titled as "Height Adjusting Assembly for Chair", which has been already filed as a patent application by the applicant of the present invention and allowed by the United States, could be suggested for the related art.

The registered patent "Height Adjusting Assembly for Chair" discloses a gas cylinder operating with use of a cable, and additionally having: a separate button additionally installed on a predetermined structure exemplified as an arm rest of a chair; and a cable operated by the button, and the gas cylinder is characterized in that its up and down movements are performed by button pressing.

With such construction, a user could adjust height of a chair by simple button pressing only with a hand, without bending his body.

Such "Height Adjusting Assembly for Chair" of the relate art, however, has following problems.

On the first place, the apparatus is so complicated that a plurality of various parts is used, and assembly process of the parts is difficult. Also, as a plurality of parts is used, manufacturing costs are increased.

Also, due to the complicated structure of the apparatus, in case that the apparatus is continuously used repeatedly, disorder is frequently generated.

Also, the apparatus of the related art could not take proper measures for load in lateral direction applied to the spindle. Further, in case that deviation of coaxiality between the spindle and the base tube is distorted due to external force repeatedly applied to the lateral side, not up and down direction (axial direction), the gas cylinder has been shaken.

Also, non-uniform frictional force is applied to the contact surface between the spindle and the main tube so that the spindle is not stably moved up and down.

SUMMARY OF THE INVENTION

An object of the invention is to solve at least the above problems and/or disadvantages and to provide at least the advantages described hereinafter.

Accordingly, one object of the present invention is to solve the foregoing problems and to provide a gas cylinder which could be more conveniently operated by a user and more simply assembled at the production spot.

Still another object of the present invention is to provide a gas cylinder capable of increasing operational reliability and stability even more.

Further still another object of the present invention is to provide a gas cylinder capable of stably operating in spite of external force applied to the gas cylinder in a non-uniform manner.

Another object of the present invention is to provide a gas cylinder capable of stably maintaining its circular shape in spite of external force applied to the lateral direction in the gas cylinder operating with use of a cable.

The foregoing and other objects and advantages are realized by providing a gas cylinder including: a spindle for receiving a piston; a base tube formed on an outer side of the spindle and in a lower end of which one end of a piston rod whose other end is fixed in the piston, is fixed; a bushing formed in a contact portion between the spindle and the base tube; a cable whose one end is pulled by external force of a user; a release arm integrally having a cable hooking part for fixing one end of the cable on its upper side, and a rotational central part formed in a lower side of the cable hooking part, for being rotated with respect to about the rotational central part by pulling operation of the cable; and a taper holder integrally having, in its inside, an arm guiding part forming a sidewall of an arm receiving hole, for receiving the release arm in its inside, and an arm hooking end projected from an inner periphery of the arm guiding part, for hooking the rotational central part upon movement of the release arm, thereby being inserted into the tapered portion in an inside of an upper end of the gas cylinder.

According to another aspect of the invention, a gas cylinder includes: a spindle for receiving a piston; a base tube formed on an outer side of the spindle and in a lower end of which one end of a piston rod whose other end is fixed in the piston, is fixed, for moving the spindle up and down; a bushing formed between a contact portion between the spindle and the base tube, and whose inner peripheral surface is of a regular polyhedral shape; a tube guide formed between the bushing and the base tube, for fixing the bushing and increasing operational reliability by preventing the gas cylinder from being transformed; a release arm formed on an upper side of the spindle, for pressing a gas opening/closing pin by being rotated due to pulling of a cable to which external force of a user is applied.

According to another aspect of the invention, a gas cylinder includes: a cable whose one end is pulled by external force of a user; a release arm integrally having a cable hooking part for fixing one end of the cable on its upper side, and a rotational central part formed in a lower side of the cable hooking part, for being rotated with respect to about the rotational central part by pulling operation of the cable; a taper holder integrally having, in its inside, an arm guiding part for forming a sidewall of an arm receiving hole, for receiving the release arm in its inside, and an arm hooking end projected from an inner periphery of the arm guiding part, for hooking the rotational central part upon movement of the release arm, thereby being inserted into the tapered portion in an inside of an upper end of the gas cylinder; and a busing inserted into a contact surface between a spindle and a base tube of the gas cylinder, for reducing frictional force upon up and down movement of the spindle.

According to the gas cylinder suggested in the foregoing, production process at the production spot could be more simplified as well as convenience of a user is improved.

Also, as the structure of the gas cylinder is simplified, operational stability and reliability of the gas cylinder could be increased and manufacturing costs are lowered even more.

Also, a contact surface between the spindle and the base tube is stably maintained, whereby operational reliability of the gas cylinder could be increased even more.

BRIEF DESCRIPTION OF THE DRAWINGS

The above objects, features and advantages of the present invention will become more apparent from the following detailed description when taken in conjunction with the accompanying drawings, in which.

DETAILED DESCRIPTION OF PREFERRED EMBODIMENTS

The following detailed description will present a gas cylinder according to a preferred embodiment of the invention in reference to the accompanying drawings. The present embodiment is merely exemplary, and one of ordinary skill in the art may easily suggest another embodiment within the spirit and scope of the present invention.

Figure 1:
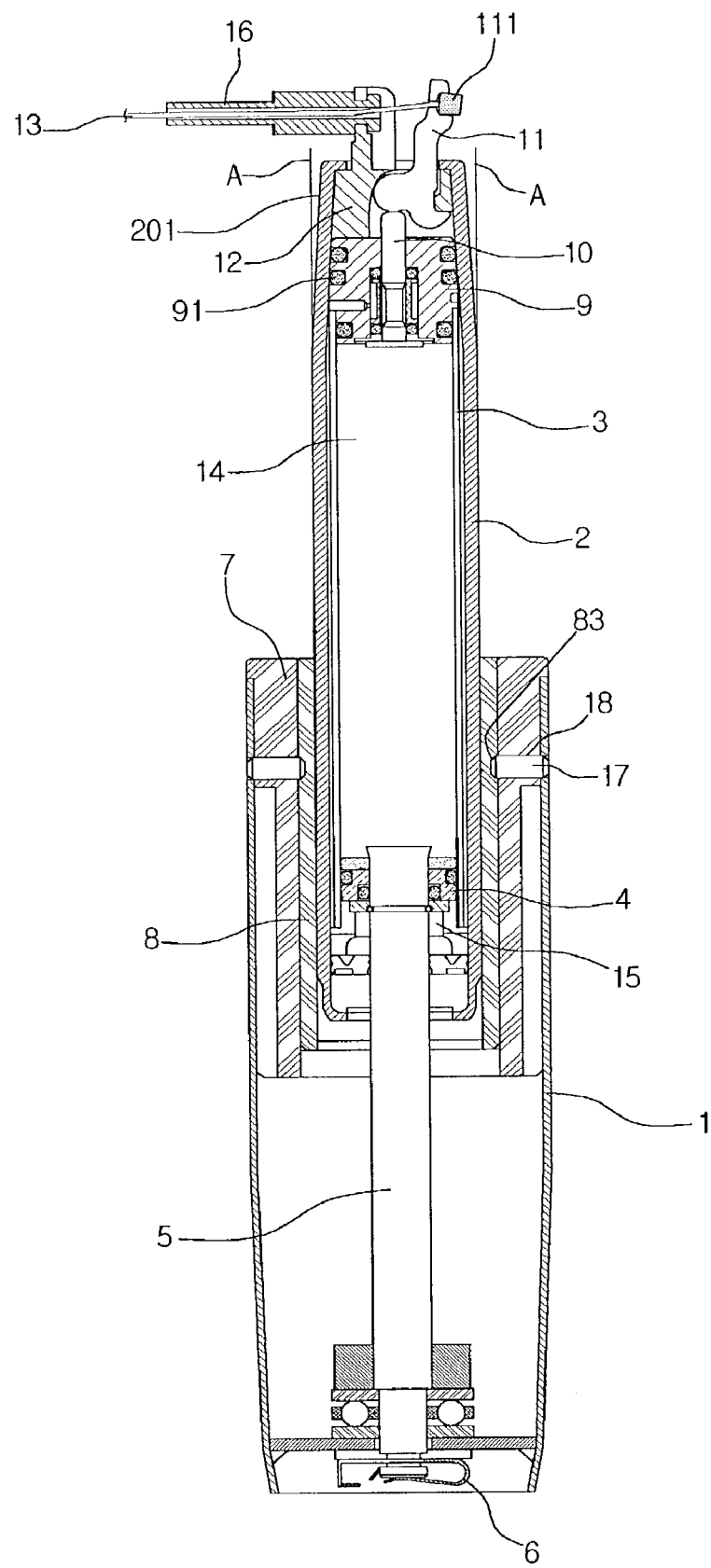
FIG. 1 is a cross-sectional view of a gas cylinder according to the present invention.

FIG. 1 is a cross-sectional view of a gas cylinder according to the present invention.

Referring to FIG. 1, a gas cylinder of the present invention includes: a base tube 1 of a cavity shape; a spindle 2 of a cavity shape, inserted into the cavity portion in the inside of the base tube 1; a tube guide 7 and a bushing additionally inserted into a contact surface between the base tube 1 and the spindle 2, for smooth up and down movement of the spindle 2; a cylinder 3 of a cavity shape additionally formed on an outer periphery of the spindle 2; a piston 4 contacted with an inner periphery of the cylinder 3, for dividing a gas filling space in the inside of the cylinder 3 into a first chamber 14 and a second chamber 15 in up and down direction; a piston rod 5 whose one end is fixed in the piston 4, and whose other end is extended to a lower side and fixed in a lower end of the base tube 1; a fixing clip 6 for fixing the other end of the piston rod 5 to the base tube 1; the tube guide 7 formed on an inner peripheral surface of the base tube 1; the busing 8 additionally formed between an inner periphery of the tube guide 7 and an outer periphery of the spindle 2; a valve 9 inserted into an inner side of the spindle 2 in about an upper side of the spindle, for selectively operating gas flow; at least more than one O-ring 91 fit in the contact surface, for maintaining sealing between an outer periphery of the valve 9 and an inner periphery of the spindle 2 and/or the cylinder 3; a gas opening/closing pin 10 inserted into about central open portion of the valve 9; a taper holder 12 additionally formed on an upper side of the valve 9; a release arm 11 for performing operation of pressing an upper end of the gas opening/closing pin 10, and whose stopping position and movement are guided by the taper holder 12; and a cable 13 for operating the release arm 11.

Also, the tube guide 7 is formed in a cylindrical shape and has, on a predetermined position of its cylindrical shape, a pair of pin holes 18 formed on opposite positions from the center, for receiving a pin; and a pin 17 inserted into the pin holes 18. The tube guide 17 is fixed and its position could be stably maintained by the pin 17.

Particularly, the end of the pin 17 is inserted further up to a pin groove 83 formed on an outer periphery of the bushing 8, whereby the busing 8 could be fixed likewise and the position of the busing once fixed could be stably supported.

In the meantime, the base tube 1, the spindle 2, the cylinder 3, the release arm 11, the taper holder 12, the valve 9, etc. are supported by high pressure gas filled in the inside of the cylinder 3, and metal may be used so that those elements may not be destroyed by stress applied by weight of a user using a chair. Also, material for the valve 9, metal could be used. But, material for the valve 9 is not limited to metal and there would be no limitation in use even though plastic material is used for the valve 9.

The cable 13 and related construction thereof will be described in detail in the following.

One end of the cable 13 is connected to the release arm 11 and the other end of the cable 13 is connected to a predetermined button. For example, for the button, a button structure of the related art installed on the arm rest of a chair could be used. The button structure formed on the other end of the cable 13 is merely exemplary and for structure for pulling the cable 13, any structure could be used as far as it is capable of pulling the cable 13 within a predetermined range, and another cable pulling structure already known in other fields, not the gas cylinder related field could also be used.

Also, a cable holder 16 fixed on the upper end of the taper holder 12, is additionally provided for guiding the position of the cable 13.

The valve 9 is reduced in its diameter at the upper side of the spindle 2 so that part of the valve 9 is inserted to the taper part 201. With such construction, up and down movement distance of the piston 4 could be increased.

More specifically, up and down length of the base tube 1 and the spindle 2 is maintained constant as before, and the installing position of the valve 9 is moved further to the upper side in the interior of the spindle 2, for being placed in the inside of the taper part 201, so that the valve 9 is positioned in the far upper side unlike the related art and the length of the piston rod 5 is lengthened as much as the movement distance of the valve 9. With such construction, the whole movement stroke of the gas cylinder could be increased. In other words, the whole length of the gas cylinder determined by the base tube 1 and the spindle 2 is maintained constant and the piston 4 is not interfered with the valve 9 during its up and down movement, so that the movement length of the piston 4 could be lengthened. Resultantly, it is possible to realize more long up and down stroke with the same size of the gas cylinder.

In the meantime, the release arm 11 is rotated around a predetermined rotational central axis, and operates the gas opening/closing pin 10. Particularly, the release arm 11 is not fixed in its position and does not have a fixed structure as a predetermined central axis, for fixing the rotational central axis. Instead, the position of the release arm 11 could be designated by operation only that the release arm 11 is inserted into a predetermined space formed in the inside of the taper holder 12. Also, the lower side of the release arm 11 is supported by the gas opening/closing pin 10.

Also, the taper holder 12 includes the release arm 11 in its inner space, and is inserted into the inside of the taper part 201 on the upper end of the spindle 2. More specifically, with mere operation that the release arm 11 is inserted into and positioned in the inside of the taper holder 12, installing process of the release arm 11 is completed, and operation of the release arm 11 is also possibly performed sufficiently without any reservation.

Also, the cable 13 inserted into and fixed in the release arm 11, passes through the release arm 11 and then is integrally fixed at the end of the release arm 11, or placed on the release arm 11 by means of a hooking member 111 on which a separate material is fixed.

Operation of the gas cylinder having the foregoing construction will be briefly described hereinafter.

At the status that the cable 13 is not pulled and the release arm 11 is not operated, the gas opening/closing pin 10 remained raised, so that gas does not flow.

On the contrary, if the cable 13 is pulled by external force, the release arm 11 is moved to the left as shown in FIG. 1, and thus the gas opening/closing pin 10 is pressed. If the gas opening/closing pin 10 is pressed, gas filled in the inside of the cylinder 3 flows from the first chamber 14 into the second chamber 15 through a fine tube formed in the cylinder 3, so that the spindle 2 and the cylinder 3 are lowered to the down direction. At the same time, the whole length of the gas cylinder is reduced and the seat of a chair is moved to the lower side.

Also, after height of the seat of a chair is adjusted as desired, force pulling the cable 13 is released so that gas flow between the chambers 14 and 15 is stopped. If gas flow is stopped, position movement of the gas cylinder in up and down direction is stopped, and thus the position of the seat of a chair is fixed. In the meantime, if external force pulling the cable 13 is removed, the position of the gas opening/closing pin 10 is moved to the upper side by pressure applied from high pressure gas in the inside of the first chamber 14, and by that force, the release arm 11 and the cable 13 could be restored to their original positions.

Constructions of the release arm 11 and the taper holder 12 will be described hereinafter.

Figure 2:
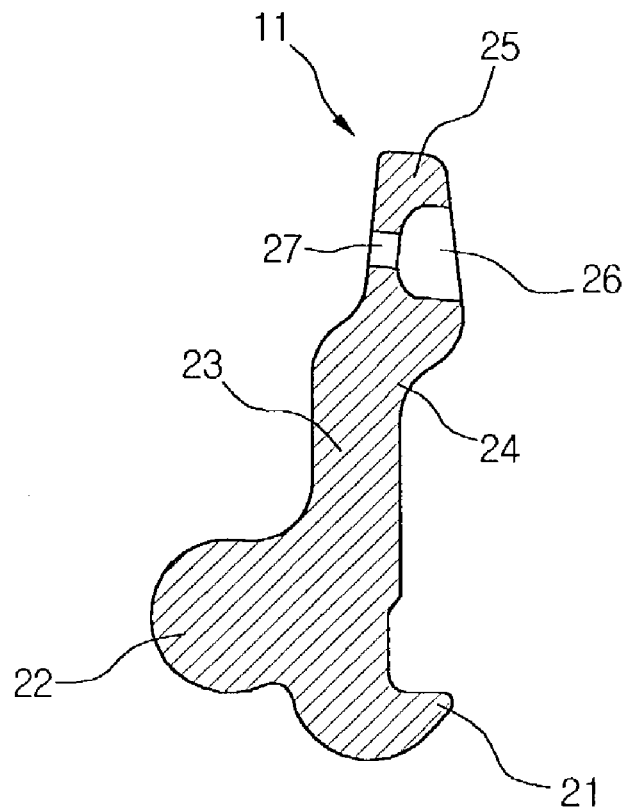
FIG. 2 is a cross-sectional view of a release arm in a gas cylinder according to the present invention.

FIG. 2 is a cross-sectional view of a release arm in the gas cylinder according to the present invention.

The release arm will be described with reference to a cross-sectional view only, for its whole side could be formed in the same thickness.

The release arm 11 includes: a rotational central part 21 for operating as a rotational center by forming a cusp in its lower end; a pin pressing part 22 formed in a smooth curved shape on the side approximately opposite to the rotational central part 21; a vertical interval maintenance part 23 extended to the upper side from the pin pressing part 22; a horizontal interval maintenance part 24 bent to about a horizontal direction from the vertical interval maintenance part 23; and a cable hooking part 25 extended further to the upper side from the horizontal interval maintenance part 24.

Also, the cable hooking part 25 includes: a cable hooking end 26 formed in a collapsing manner on one side of the cable hooking part 25, for fixing the end of the cable 13; a cable receiving hole 27 formed by piecing the cable hooking part 25 at the position where the cable hooking end 26 collapses. The cable hooking part 25 may have a predetermined hooking member (refer to reference numeral 11 in FIG. 1) lest the cable (refer to reference numeral 13 in FIG. 1) should fall out, but it is not an indispensable member.

Figure 3A:
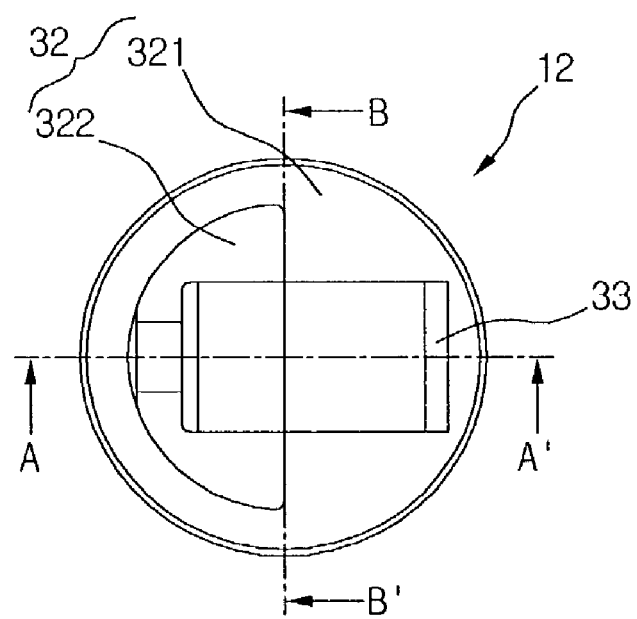
FIG. 3A is a plan view of a taper holder according to the present invention.
Figure 3B:
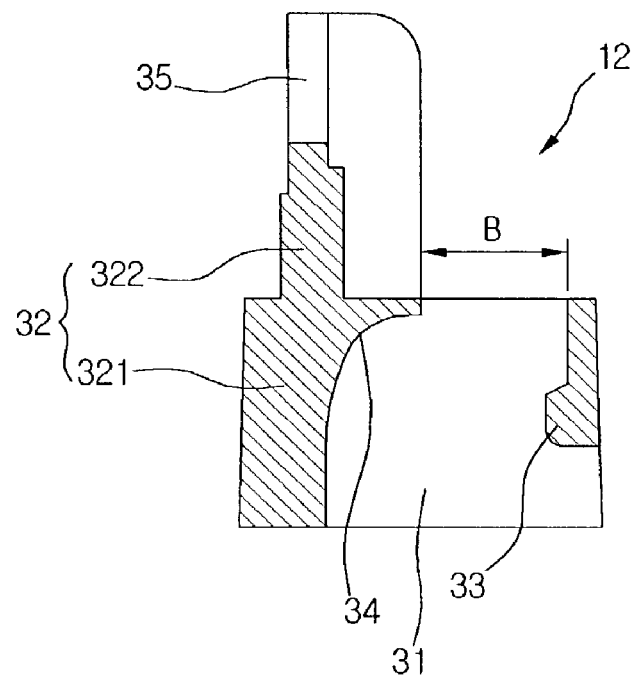
FIG. 3B is a cross-sectional view of a taper holder according to the present invention, taken along line A–A' of FIG. 3A.
Figure 3C:
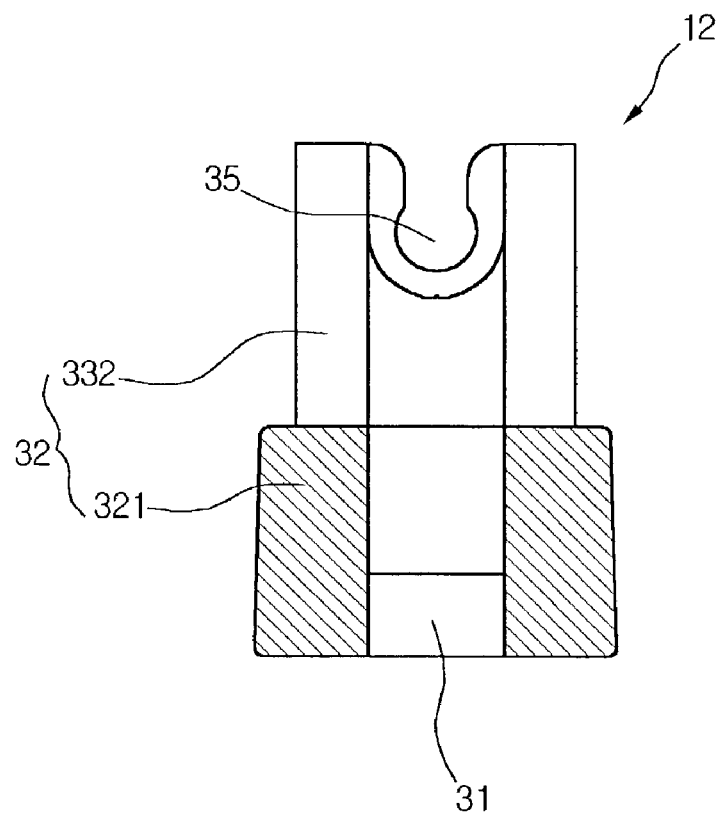
FIG. 3C is a cross-sectional view of a taper holder according to the present invention, taken along line B–B' of FIG. 3A.

FIG. 3A is a plan view of a taper holder according to the present invention, FIG. 3B is a cross-sectional view of a taper holder according to the present invention, taken along line A–A' of FIG. 3A, and FIG. 3C is a cross-sectional view of a taper holder according to the present invention, taken along line B–B' of FIG. 3A.

Referring to FIG. 3A, FIG. 3B, FIG. 3C, an arm receiving hole 31 formed properly larger than the thickness of the release arm 11 in the inside of the taper holder 12; an arm guiding part 32 forming both sidewalls of the arm receiving hole 31; an arm hooking end 33 for operating as a central point of the rotational motion of the release arm 11 by hooking the end forming a cusp in the rotational central part (refer to reference numeral 26 in FIG. 2); a guiding plane 34 curved in a specific shape similar to the movement position of the pin pressing part (refer to reference numeral 22 in FIG. 2), for smoothly guiding rotational motion of the release arm 11 by being plane-contacted with the pin pressing part 22; and a cable receiving groove 35 formed in a collapsing manner at the upper end of the arm guiding part 32, are provided.

A cable holder 16 having a predetermined hole in its inside, is fixed in the cable receiving hole 35, so that position of the cable could be guided.

More specifically, the arm guiding part 32 has a lower arm guiding part 321 for receiving the rotational central part 21, the pin pressing part 22, and at least a part of the vertical interval maintenance part 23. Also, an upper arm guiding part 322 for receiving the cable hooking part 25, the horizontal interval maintenance part 24, and at least a part of the vertical interval maintenance part 23, is provided to the arm guiding part 32.

Mutual relation between the release arm 11 and the taper holder 12 will be described in the following.

The vertical interval maintenance part 23, which is a part of the release arm 11, gets the release arm 11 to escape from the range of the lower arm guiding part 321 to the upper side, moving back and forth. Particularly, the vertical interval maintenance part 23 could move back and forth within the range of a width (refer to a width "B" in FIG. 3B) of the arm receiving hole 31.

Also, the vertical interval maintenance part 23 increases moment by lengthening the distance between the cable hooking part 25 and the pin pressing part 22, so that external force applied to the cable hooking part 25 gets more stronger on the pin pressing part 22. Therefore, even in case that force pulling the cable hooking part 25 is small, force applied to the pin pressing part 22 gets large as much as a predetermined amount, so that operational reliability of the gas cylinder could be improved.

Also, the horizontal interval maintenance part 24 is formed by being bent to about the horizontal direction, more specifically, upper right side as much as a predetermined length from the vertical interval maintenance part 23, for smoothly securing movement space of the release arm 11 when the cable 13 is pulled. In other words, in case that the horizontal interval maintenance part 24 is not formed, the upper end of the release arm 11 could interfere with the upper arm guiding part 322 when the release arm 11 is pulled to its maximum. The horizontal interval maintenance part 24 is provided to prevent such interference.

Mutual operations between the release arm 11 and the taper holder 12 will be described in the following.

The release arm 11 is inserted into the lower side of the taper holder 12 and positioned on the arm receiving hole 31. At the moment, as the open portion at the lower side of the arm receiving hole 31 is formed larger than the release arm 11, there is no difficulty in receiving the release arm 11.

If the release arm 11 is settled down in the inside of the arm receiving hole 31, the pin pressing part 22 is plane-contacted with the guiding plane 34 and one side of the release arm 11 is stably supported. Also, the rotational central part 21 is placed for being contacted with the arm hooking end 33 so that the other side of the release arm 11 is stably supported. Also, the gas opening/closing pin 10 is positioned at the lower side of the release arm 11, for supporting weight of the release arm 11, whereby the position of the release arm 11 could be stably maintained on the whole.

Also, when the release arm 11 is changed in its position, the position of the release arm 11 is guided by the contact status of the pin pressing part 22 and the guiding plane 34, and the contact status of the rotational central part 21 and the arm hooking end 33, so that the release arm 11 could be stably operated. Particularly, the rotational central part 21 is hooked at the arm hooking end 33, so that the rotational central part 21 operates as the center point for rotation of the release arm 11 on the whole.

Also, in the release arm 11, as the arm receiving hole 31 is thicker than the release arm 11, movement of the release arm 11 could be made freely within a predetermined range.

Figure 4:
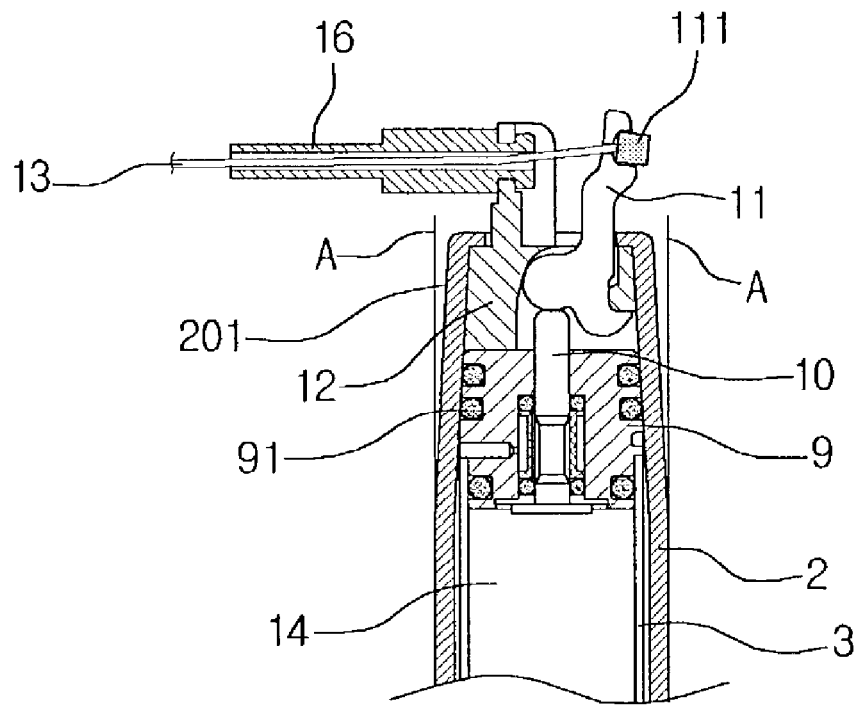
FIG. 4 is a drawing explaining operation of the present invention, showing a status that external force is not applied to a gas opening/closing pin.

FIG. 4 is a drawing explaining operation of the present invention, showing a status that external force is not applied to the gas opening/closing pin.

Referring to FIG. 4, in case that external force is not applied by a user, the cable 13 is not pulled and the release arm 11 remains rotated clockwise around the rotational central part 21.

Also, in that case, the pin pressing part 22 does not press the gas opening/closing pin (refer to reference numeral 10 in FIG. 1) and gas flow between the chambers 14, 15 is not performed. Therefore, up and down movements of the gas cylinder remains stopped.

Figure 5:
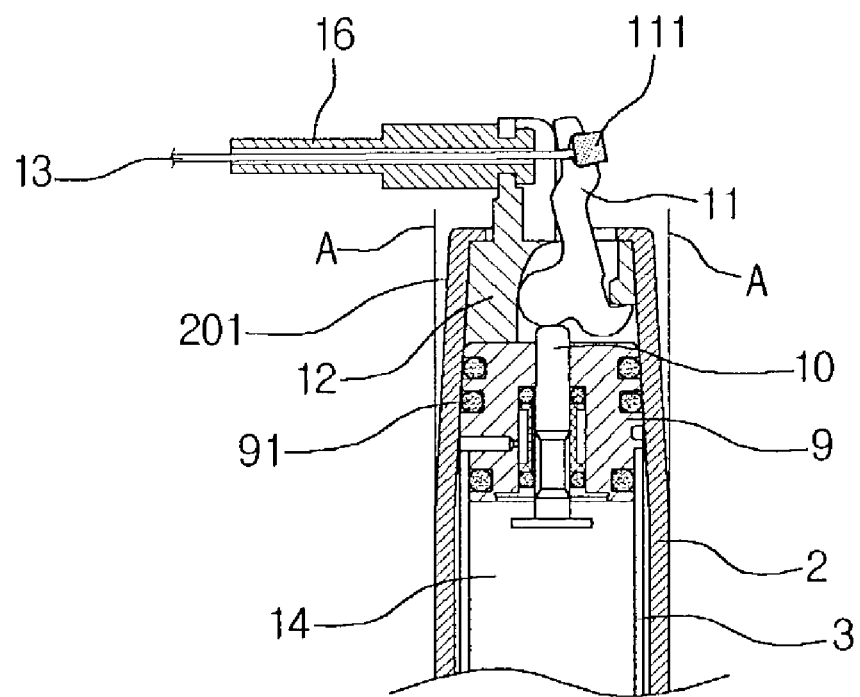
FIG. 5 is a drawing explaining operation of the present invention, showing a status that external force is applied to a gas opening/closing pin.

FIG. 5 is a drawing explaining operation of the present invention, showing a status that external force is applied to the gas opening/closing pin.

Referring to FIG. 5, in case that external force is applied by a user, the cable 13 is pulled and the release arm 11 is rotated counterclockwise around the rotational central part 21.

Also, in that case, the pin pressing part 22 presses the gas opening/closing pin (refer to reference numeral 10 in FIG. 1) and gas flow between the chambers 14, 15 could be performed. Namely, in case that a user sits down on the seat of a chair, the spindle is moved to the lower side, and contraction of cylinder is caused, while in case that a user does not sit on the seat of a chair, the spindle is moved to the upper side and the gas cylinder is extended.

Particularly, upon operation of the release arm 11, the curved portion of the pin pressing part 22 presses, in its lower side, the gas opening/closing pin 10 and the curved portion of the pin pressing part 22 is plane-contacted, in its lateral side, with the guiding plane 34, so that the release arm 11 is stably operated. Also, the rotational central part 21 is hooked at the arm hooking end 33, and thus the release arm 11 has no or trivial amount in its position change due to translational motion, and only rotational motion around the cusp at the end of the rotational central part 21, could be performed.

As described above, the movement of the release arm 11 could be supported by the taper holder 12 without separate additional construction. Also, when the release arm 11 is not operated and stopped, the weight of the release arm 11 could be supported by the gas opening/closing pin 10, and thus the release arm 11 could be stably positioned.

Supporting structure for the spindle 2, capable of stably guiding up and down movement of the spindle 2 will be described in detail hereinafter.

Referring to FIG. 1, a tube guide 7 and a bushing 8 are inserted to the contact portion between the spindle 2 and the base tube 1. Also, positions of the tube guide 7 and the bushing 8 are fixed by a pin 17 passing through and inserted into the base tube 1.

For receiving the pin 17, the tube guide 7 and the bushing 8 have a pin hole 18 on its predetermined position and a pin groove 83 on its outer peripheral surface, respectively.

The tube guide 7 and/or the bushing 8 are inserted into the inside of the base tube 1, and the pin hole 18 and the pin groove 83 are formed in a row with use of a tool such as a drill on the tube guide 7 and the bushing 8 inserted to the appropriate position. Also, the pin 17 is inserted and fixed between the pin hole 18 and the pin groove 83, whereby positions of the base tube 1, the tube guide 7, and the bushing 8 could be fixed. At the moment, the tube guide 7 and/or the bushing 8 may be inserted in a push fitting manner.

In the meantime, the installing position in the upper end of the bushing 8 is aligned with the upper end of the tube guide 7, so that in case that the spindle 2 is moved to the position in the upper extreme and the position of the gas cylinder is extended to its maximum, the spindle 2 could be sufficiently supported. With such construction, the spindle 2 is not shaken right and left. Also, at the moment, up and down movement of the spindle 2 could also be exactly guided, of course.

But, the such method for fixing the tube guide 7 and the bushing 8 is merely exemplary, and for a detailed embodiment of the present invention, a variety of methods could be suggested. For example, the pin hole and the pin groove respectively formed are aligned in a row, for receiving a predetermined pin, or instead of the method using the pin hole and the pin groove, the tube guide 7 and the bushing 8 could also be fixed by the methods such as welding.

Figure 6:
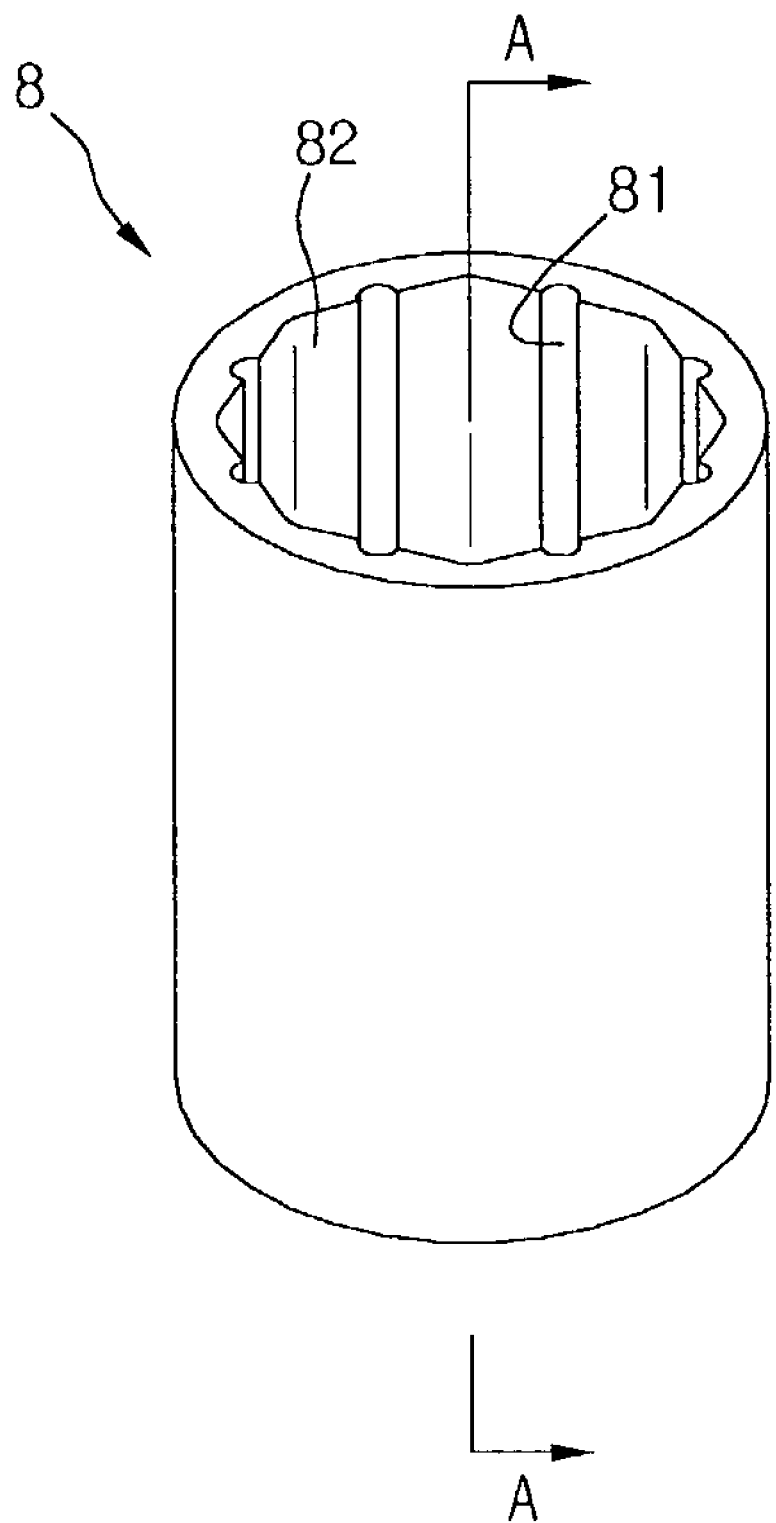
FIG. 6 is a perspective view of a bushing according to the present invention.
Figure 7:
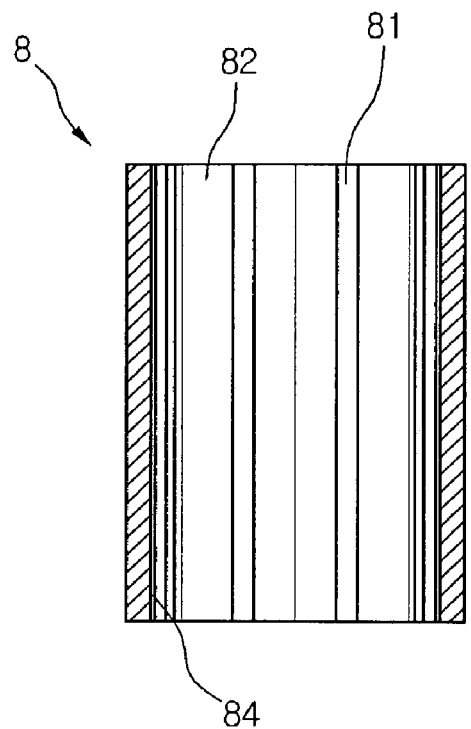
FIG. 7 is a cross-sectional view of a bushing according to the present invention, taken along line A–A'.

FIG. 6 is a perspective view of the bushing according to the present invention, and FIG. 7 is a cross-sectional view of the bushing according to the present invention. Particularly, FIG. 7 is a cross-sectional view of the bushing, taken along line A–A' in FIG. 6.

Referring to FIG. 6 through FIG. 7, the outer peripheral surface of the bushing 8 is of a circular shape and the inner peripheral surface of the pushing 8 forms a cylindrical shape of an octagon.

The bushing 8 includes: a pin groove 83 formed on its outer peripheral surface, for fixing the position of the bushing 8; a contact surface 82 forming octagonal edges on the inner peripheral surface of the bushing 8; a lubricating groove 81 formed lengthwise in up and down direction on the contact surface 82; a lubricating surface 84 formed by covering the contact surface 82.

Mores specifically, the inner peripheral surface of the bushing 8 forms a octagonal shape, reducing contact surface upon contact with the outer peripheral surface of the spindle 2, thereby minimizing frictional force on the contact surface upon movement of the spindle 2 and the bushing 8. But, the octagonal shape is merely exemplary and it does not matter much to use polyhedral shape more than that, e.g., hexagon or decagon.

Also, the lubrication groove 81 is formed in a collapsing manner, lengthwise up and down direction, on a predetermined portion of the contact surface 82 and grease is injected to its inside. By such lubricating groove 81 in which the grease is injected, the contact surface between the spindle 2 and the bushing 8, is reduced, and thus frictional force could be reduced. Further, by lubricating operation of the grease, frictional force could be reduced even more.

Preferably, the lubricating groove 81 is formed on about the central portion of the contact surface 82, so that the contact area between the spindle 2 and the bushing 8 could be reduced even more. But, the present invention is not limited to the characteristics that the lubricating groove 81 is formed on the central portion of the contact surface 82, but the present invention could sufficiently reduce frictional force between the spindle 2 and the bushing 8 as far as the lubricating groove 81 is formed lengthwise up and down direction on the contact surface 82 with a constant interval intervened.

Also, a number of the contact surface 82 and the lubricating groove 81 is the same as a number of the edges of the polyhedral shape forming the inner peripheral surface of the bushing 8. For example, in case that the bushing 8 has the inner peripheral surface of an octagonal shape, eight contact surfaces and eight lubricating grooves are formed, respectively. But, it does not matter as far as the contact surfaces and the lubricating grooves are formed according to a regular rule, though they are not same in their number.

Also, for the lubricating surface 84 formed by being plastered on the contact surface 82, at least more than one material selected among nylon, $M_oS_2$, PTEE(PolyTetraFlourEthylene) may be used. Also, the lubricating surface 84 could be 2–800 micrometer in its thickness. Preferably, the lubricating surface 84 could be 200–400 micrometer in its thickness.

The lubricating surface 84 plays a role of smoothing friction between the bushing 8 and the spindle 2 even after the grease injected in the inside of the lubricating groove 81 is removed, so that frictional movement between the bushing 8 and the spindle 2 could be moderately performed.

By such bushing 8, frictional force generated upon up and down movement of the spindle 2, could be reduced, and thus the gas cylinder could be smoothly operated. Also, as the outer peripheral surface of the spindle 2 could be strongly supported by such bushing 8, the gas cylinder could be stably operated with the bushing 8 and the spindle 2 not transformed by external force in the lateral direction applied to the spindle 2. Therefore, deviation from coaxiality between the spindle 2 and the bushing 8 could be maintained, so that the gas cylinder could be reliably operated.

Particularly, as the upper end of the bushing 8 is formed up to the same height as the upper end of the tube guide 7, in case that the spindle 2 is extended to its maximum, the bushing 8 could firmly support the whole outer periphery of the spindle. Further, even at the status that the spindle 2 is extended to its maximum, the spindle 2 is not shaken right and left and its position could be supported.

Also, the pin groove 83 is formed for receiving the pin 17, and it does not matter as far as the pin groove 83 is processed by a drill and receives the pin 17 in its inside.

Figure 8:
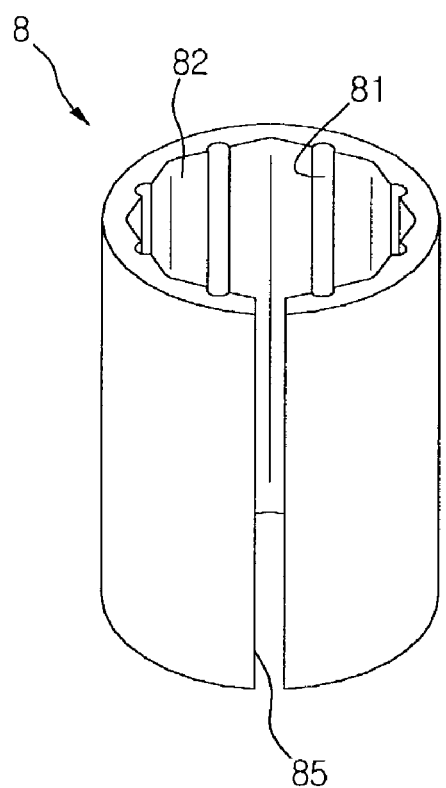
FIG. 8 is a drawing showing another embodiment of a bushing according to the present invention.

FIG. 8 is a drawing showing another embodiment of a bushing according to the present invention.

Referring to FIG. 8, the bushing of the present embodiment is almost the same as the bushing suggested in FIG. 6 through FIG. 7 with only exception that a cut part 85 cut lengthwise up and down direction on the outer periphery of the cylindrical bushing 8, is additionally formed.

The cut part 85 could be applied for the case that the bushing 8 of a cylindrical tube shape is forcibly inserted into the tube guide 7 by external force. By overall transformation of the bushing that the cut part 85 is reduced in its width upon insertion of the bushing 8, push fitting process could be easily performed.

According to the present invention, a user could operate the gas cylinder in a more convenient manner and perform assembling process for the gas cylinder in a more simply manner.

Also, according to the present invention, operational reliability and stability of the gas cylinder could be improved even more, and the gas cylinder could be operated by means of the simple mechanical construction. Also, manufacturing costs for the gas cylinder could be reduced even more.

Also, the whole position of the spindle could be stably supported upon up and down movement of the spindle of the gas cylinder, whereby the gas cylinder could be operated in normal status.

Also, frictional force applied from the supporting structure upon up and down movement of the spindle, gets reduced, so that the spindle could move smoothly in up and down direction. Also, frictional force is reduced and transformation of the spindle and the supporting structure due to external force from the lateral direction, is prevented, whereby operation of the gas cylinder could be maintained in a more stable manner.

While the invention has been shown and described with reference to certain preferred embodiments thereof, it will be understood by those skilled in the art that various changes in form and details may be made therein without departing from the spirit and scope of the invention as defined by the appended claims.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structures described herein as performing the recited function and not only structural equivalents but also equivalent structures.

What is claimed is:

1. A gas cylinder comprising:
   a spindle for receiving a piston;
   a base tube formed on an outer side of the spindle and in a lower end of which one end of a piston rod whose other end is fixed in the piston, is fixed;

a bushing formed in a contact portion between the spindle and the base tube;

a cable whose one end is pulled by external force of a user;

a release arm integrally having a cable hooking part for fixing one end of the cable on its upper side, and a rotational central part formed in a lower side of the cable hooking part, the rotational central part being rotated by pulling operation of the cable;

a taper holder integrally having, in its inside, an arm guiding part for forming a sidewall of an arm receiving hole, for receiving the release arm in its inside, and an arm hooking end projected from an inner periphery of the arm guiding part, for hooking the rotational central part upon movement of the release arm, thereby being inserted into a tapered portion in an inside of an upper end of the gas cylinder;

a pin pressing part additionally provided in form of a smooth curve shape together with the release arm, on an opposite side of the rotational central part; and a guiding plane-contacted with the pin pressing part upon movement of the release arm, and formed by being curved on an inner peripheral surface of the arm guiding part.

2. The gas cylinder according to claim 1, wherein in case that the cable is not pulled, a lower side of the release arm is supported by a gas opening/closing pin.

3. The gas cylinder according to claim 1, wherein a valve inserted into a tapered portion in an upper side of the gas cylinder, for supporting a gas opening/closing pin, is additionally formed on a lower side of the taper holder, so that up and down stroke of the gas cylinder is extended.

4. The gas cylinder according to claim 1, wherein the arm guiding part further comprises:

a lower arm guiding part inserted into an inner peripheral surface of a tapered portion in an upper side of the gas cylinder; and an upper arm guiding part extended further to an upper part of the lower arm guiding part, and has, in its upper side, a cable receiving groove for receiving the cable.

5. The gas cylinder according to claim 1, further comprising a cable holder fixed on an upper end of the taper holder, for guiding a position and pulling operation of the cable.

6. The gas cylinder according to claim 1, wherein a vertical interval maintaining part extended to an upper side from the rotational central part, for reliable operation of the release arm upon application of external force to the cable, is provided between the cable hooking part and the rotational central part.

7. The gas cylinder according to claim 1, wherein a horizontal interval maintaining part forming a part of the release arm and extended to about a horizontal direction, for preventing interference with the arm guiding part upon movement of the release arm.

8. The gas cylinder according to claim 1, wherein the release arm is formed in a constant thickness and the arm receiving hole is wider in its width than a thickness of the release arm.

9. The gas cylinder according to claim 1, wherein a portion positioned on an end of the rotational central part, touching the arm hooking end forms a cusp.

10. The gas cylinder according to claim 1, wherein a tube guide for fixing the bushing is provided between the bushing and the base tube.

11. The gas cylinder according to claim 10, wherein upper ends of the bushing and the tube guide are the same height.

12. The gas cylinder according to claim 1, wherein an inner peripheral surface of the bushing forms a polyhedral shape, for reducing frictional force.

13. The gas cylinder according to claim 1, wherein an inner peripheral surface of the bushing has a lubricating surface.

14. The gas cylinder according to claim 1, wherein an inner peripheral surface of the bushing has a lubricating surface including at least more than one material selected among nylon, $MoS_2$, PTFE(PolyTetraFlourEthylene).

15. The gas cylinder according to claim 1, wherein an inner peripheral surface of the bushing has a lubricating surface whose thickness is 2–800 micrometer.

16. The gas cylinder according to claim 1, wherein a lubricating groove regularly formed lengthwise up and down direction and has grease injected in its inside, is provided on a contact surface through which the bushing is contacted with the spindle.

17. A gas cylinder comprising:

a cable whose one end is pulled by external force of a user;

a release arm integrally having, on its upper side, a cable hooking part for fixing one end of the cable, and a rotational central part formed in a lower side of the cable hooking part, the rotational central part being rotated by pulling operation of the cable, wherein a portion positioned on an end of the rotational central part, touching the arm hooking end forms a cusp;

a taper holder integrally having, in its inside, an arm guiding part for forming a sidewall of an arm receiving hole, for receiving the release arm in its inside, and an arm hooking end projected from an inner periphery of the arm guiding part, for hooking the rotational central part upon movement of the release arm, thereby being inserted into a tapered portion in an inside of an upper end of the gas cylinder; and a busing inserted into a contact surface between a spindle and a base tube of the gas cylinder, for reducing frictional force upon up and down movement of the spindle.

18. The gas cylinder according to claim 17, wherein in case that the cable is not pulled, a lower side of the release arm is supported by a gas opening/closing pin.

19. A gas cylinder comprising:

a spindle for receiving a piston;

a base tube formed on an outer side of the spindle and in a lower end of which one end of a piston rod whose other end is fixed in the piston, is fixed;

a cable whose one end is pulled by external force of a user;

a release arm integrally having a cable hooking part for fixing one end of the cable on its upper side, and a rotational central part formed in a lower side of the cable hooking part, the rotational central part being rotated by pulling operation of the cable;

a taper holder integrally having, in its inside, an arm guiding part for forming a sidewall of an arm receiving hole, for receiving the release arm in its inside, and an arm hooking end projected from an inner periphery of the arm guiding part, for hooking the rotational central part upon movement of the release arm, thereby being inserted into a tapered portion in an inside of an upper end of the gas cylinder;

a pin pressing part additionally provided in form of a smooth curve shape together with the release arm, on an opposite side of the rotational central part; and a guiding plane-contacted with the pin pressing part upon movement of the release arm, and formed by being curved on an inner peripheral surface of the arm guiding part.

* * * * *